United States Patent
Nahrwold

(10) Patent No.: US 12,458,572 B2
(45) Date of Patent: Nov. 4, 2025

(54) HOMOGENEOUS LIQUID COMPOSITION COMPRISING 1,2-OCTANEDIOL AND USE THEREOF

(71) Applicant: Minasolve SAS, Beuvry-la-Forêt (FR)

(72) Inventor: Markus Nahrwold, Minden (DE)

(73) Assignee: Minasolve SAS, Beuvry-la-Forêt (FR)

( * ) Notice: Subject to any disclaimer, the term of this patent is extended or adjusted under 35 U.S.C. 154(b) by 432 days.

(21) Appl. No.: 17/907,475

(22) PCT Filed: Mar. 30, 2021

(86) PCT No.: PCT/EP2021/058345
§ 371 (c)(1),
(2) Date: Sep. 27, 2022

(87) PCT Pub. No.: WO2021/198285
PCT Pub. Date: Oct. 7, 2021

(65) Prior Publication Data
US 2023/0118373 A1    Apr. 20, 2023

(30) Foreign Application Priority Data
Mar. 31, 2020 (EP) .................................... 20167141

(51) Int. Cl.
*A61K 8/00* (2006.01)
*A61K 8/34* (2006.01)
*A61Q 5/02* (2006.01)

(52) U.S. Cl.
CPC ............... *A61K 8/345* (2013.01); *A61Q 5/02* (2013.01)

(58) Field of Classification Search
None
See application file for complete search history.

(56) References Cited

U.S. PATENT DOCUMENTS

2004/0228820 A1 * 11/2004 Elliott ....................... A61K 8/42
424/74

FOREIGN PATENT DOCUMENTS

| CN | 106511119 A | 3/2017 |
|---|---|---|
| EP | 1876162 A1 | 1/2008 |
| EP | 3075401 A1 | 10/2016 |
| WO | 2006/057616 A1 | 6/2006 |
| WO | 2018/101930 A1 | 6/2018 |
| WO | 2021/198285 A1 | 7/2021 |

OTHER PUBLICATIONS

7 "Product Information: dermosoft Ip", Hamburg, Germany Jan. 1, 2010 (Jan. 1, 2010), p. 1-11, Retrieved from the Internet: URL:http://www.dr-straetmans.de/customer-login/productdocumentation/Dermosoft_LP/Product_Leaflet_Dermosoft_LP.pdf.
8 Anonymous, "dermosoft LP MB | Evonik Dr. Straetmans GmbH", Jul. 9, 2016 (Jul. 9, 2016), Retrieved from the Internet: URL:https://www.dr-straetmans.de/de/produkte/dermosoft-lp-lp/.
9 John Woodruff, "Cosmetic Preservation", Jan. 1, 2016 (Jan. 1, 2016), Retrieved from the Internet: URL:http://creative-developments.co.uk/wp-content/uploads/2013/10/Cosmetic-Preservation-2016.pdf.
10 Anonymous, "Caprylyl glycol", "International Cosmetic Ingredient Dictionary and Handbook", Dec. 30, 2008 (Dec. 30, 2008), The Cosmetics, Toiletry, and Fragrance Association.
11 Anonymous, "Glycerin", Apr. 22, 2020 (Apr. 22, 2020), Retrieved from the Internet: URL:https://elmaskincare.com/h_menu/glycerin.htm.
ISR-WO dated Jul. 2, 2021 for parent application PCT/EP2021/058345.

* cited by examiner

*Primary Examiner* — Necholus Ogden, Jr.
(74) *Attorney, Agent, or Firm* — Vorys, Sater, Seymour and Pease, LLP

(57) ABSTRACT

The current invention relates to a homogeneous liquid composition comprising:
as component (A) from 50 wt.-% to 90 wt.-% of 1,2-octanediol;
as component (B) from 0.1 wt.-% to 30 wt.-% of at least one C3-C4 alkanediol and/or C3-C4 alkanetriol,
supplemented with 10 water as component (C) up to 100 wt.-%.
The current invention also relates to uses of the homogeneous liquid composition according to the invention and also pertains to a cosmetic, pharmaceutical, dermatological or hygienic product comprising a homogeneous liquid composition 15 according to the invention.

14 Claims, No Drawings

HOMOGENEOUS LIQUID COMPOSITION COMPRISING 1,2-OCTANEDIOL AND USE THEREOF

FIELD OF THE INVENTION

The present invention relates to a homogeneous liquid composition comprising 1,2-octanediol, water and at least one C3-C4 alkanediol and/or C3-C4 alkanetriol. The present invention also relates to uses of the homogeneous liquid composition according to the invention. The present invention also relates to a product, in particular a cosmetic, pharmaceutical, dermatological or hygienic product, comprising a homogeneous liquid composition according to the invention.

BACKGROUND 1,2-octanediol, with octane-1,2-diol, 1,2-dihydroxyoctane and caprylyl glycol as well-known alternative names, is a well-known ingredient that is commonly used in personal care products and that offers a multitude of beneficial effects. Its hydrophilic diol-moiety enables the absorption of moisture from the atmosphere. The lipophilic alkyl-function provides further conditioning and emollient effects and helps the skin to retain its moisture. 1,2-octanediol is also known for its broad spectrum antimicrobial activity, in particular against bacteria. This effect is observed already at low use-levels of between 0.1 wt.-% and 1 wt.-%. The underlying mechanism of action is related to a physical weakening of cell membranes. Synergistic effects in conjunction with other antimicrobial agents are frequently observed.

Besides its wide application in hygiene and personal care products, 1,2-octanediol can also be used as a valuable and cost-effective additive in a multitude of further, preferably aqueous formulations. Its weak surface activity suggests a variety of technical applications, such as rheology modification, solubilization of lipophilic components and enhancement of visual clarity.

Pure 1,2-octanediol of more than 97 wt.-% content is a waxy solid at ambient temperature with a melting range of 28-33° C. The substance frequently forms an undercooled melt that remains stable as a liquid below its melting point for an unpredictable period of time. Therefore, 1,2 octanediol is typically molten before its use by heating to temperatures ranging from 30° C. to about 100° C. This mandatory melting process correlates with a variety of drawbacks:

The heating process consumes energy and requires suitable heating equipment, such as large ovens, which increases the cost of handling.

The melting process can take several hours or even days, depending on the chosen temperature and the amount of substance to be molten. Slow or incomplete melting is frequently observed, which bears the occasional necessity for repeated or elongated heating and consequently reduces productivity.

Incomplete melting of the solid may lead to dosage errors due to residual material remaining inside the packaging item.

The handling of the hot product bears health and safety risks, such as burning of the skin or the inhalation of irritant vapor.

The solidified melt of 1,2-octanediol has a higher volume than its liquid form. This characteristic may lead to the distortion or damage of packaging items.

Solidified 1,2-octanediol may finally block non-heated parts of the processing equipment, such as pipes, hoses and valves. This circumstance may lead to expensive errors and downtimes.

In summary, pure 1,2-octanediol is inconvenient and expensive to use. Its handling as a hot melt can be harmful and is especially cumbersome in cold-process applications such as the production of toiletries, wet wipes or perfumes.

There are different solutions available in the state of the art which aim at overcoming the described drawbacks related to the handling of pure 1,2-octanediol:

1,2-octanediol is a lipophilic substance that mixes well with other lipophilic components. Combinations of 1,2-octanediol with a multitude of lipophilic ingredients are therefore commercially available. This includes mixtures with benzyl alcohol, ethylhexylglycerin, glyceryl caprylate, glyceryl caprate, phenethyl alcohol, phenylpropanol and phenoxyethanol. All these compositions are liquids at ambient temperature due to a lowered melting point. However, the lipophilic additives generally affect the activity profile of 1,2-octanediol, e.g. by influencing its physical behavior in formulations, changing its effect on skin or introducing an additional odor. It is therefore hardly possible to directly substitute pure 1,2-octanediol by a mixture of 1,2-octanediol and the above-mentioned lipophilic co-formulants. In most cases the formulations need to be adjusted according to the properties of the chosen lipophilic additive.

A variety of mixtures of 1,2-octanediol with water-soluble alkanediols are also commercially available. Examples comprise combinations of 1,2-octanediol with 1,2-propanediol (propylene glycol), 1,3-propanediol, methylpropanediol, butylene glycol, 1,2-pentanediol (pentylene glycol), 1,2-hexanediol and hexylene glycol. All these glycol additives can help to improve the partitioning of 1,2-octanediol in the water phase of emulsions, thus increasing its antimicrobial activity. However, in most cases these hydrophilic glycols represent a major component of the liquid mixture, since 1,2-octanediol being present at high concentrations tends to crystallize at lower temperatures. This leads to a comparably high in-use concentration of said mixtures, resulting in a larger influence on the formulation and a lower flexibility for the formulator. Finally, all the hydrophilic additives mentioned above provide a certain emollient, humectant or solvent effect on their own. They consequently influence the character of the final formulations, such as their rheology, spreading and skin feel. Mixtures of 1,2-octanediol and water-soluble alkanediols can therefore hardly be used as one to one substitute for pure 1,2-octanediol.

Several attempts were made to stabilize 1,2-octanediol with the help of truly inert additives. Mixtures of 1,2-octanediol and water are commercially available, e.g. under the brand names "Microcare® Emollient WCLG" offered by THOR and "Hydrolite® CGW" offered by Symrise AG. The handling of these mixtures is easier compared to pure 1,2-octanediol, but additional technical steps are still necessary. While blends of 1,2-octanediol and water can form clear liquids at higher temperature, they usually become cloudy and inhomogeneous when being stored or transported at temperatures below 10° C. Prolonged storage at a temperature of minimum 25° C. and subsequent homogenization by mechanical mixing are usually necessary to restore liquid mixtures of uniform composition.

None of the above-mentioned solutions provides a liquid form of 1,2-octanediol without significantly altering its performance profile. Furthermore, none of the above-mentioned solutions contains a high concentration of 1,2 octanediol and at the same time does not separate upon repeated freezing and thawing.

WO 2015/063471 A1 discloses stabilized multiple emulsions comprising the compounds a), b) and c), methods for the stabilization of multiple emulsions and the use of multiple emulsions as skin protection products, in particular for protection against aqueous noxa, where: a) at least one aliphatic unbranched diol with 2 to 4 carbon atoms in the hydrocarbon chain, b) at least one further branched or unbranched aliphatic diol with 4 to 12 carbon atoms in the hydrocarbon chain that is different from a), whereby the hydrocarbon chain may be interrupted by an oxygen atom, c) at least one single-value aliphatic alcohol with 12 to 30 carbon atoms in the hydrocarbon chain. WO 2015/063471 A1 shows the problem that in embodiments of the multiple emulsions, 1,2-octanediol is only used in rather low concentrations, and this in combination with similar or even higher concentrations of other water-soluble alkanediols, which is expected to significantly alter the performance profile of 1,2-octanediol.

The present invention relates to a hygiene product or pharmaceutical composition in the form of a gel or dressing, for topical application to the skin or mucosa including glycerol, at least one poly(meth)acrylate polymer, at least one polyethylene glycol with a molecular weight of less than 1000 g/mol, octanediol and water.

The present invention aims to resolve at least some of the problems and disadvantages mentioned above. In particular, it is desirable to solve the technical problem of providing a stable, liquid and easy to use form of 1,2-octanediol by combining it with low-cost, safe and neutral additives for physical stabilization. The resulting blend should offer a safe and cost-effective alternative to pure 1,2-octanediol while still providing maximum flexibility to a formulator.

SUMMARY OF THE INVENTION

In a first aspect, the present invention relates to a homogeneous liquid composition, according to claim 1. Preferred embodiments of the homogeneous liquid composition according to the first aspect of the invention are shown in any of the claims 2 to 10.

In a second aspect, the invention relates to a use of a homogeneous liquid composition according to the first aspect of the invention by dosing said composition as a liquid in batch and/or continuous processes where said composition is not heated above 30° C., according to claim 11. A preferred embodiment of the use according to the second aspect of the invention is shown in claim 12.

In a third aspect, the invention relates to a use of a homogeneous liquid composition according to the first aspect of the invention in cosmetic, pharmaceutical, dermatological or hygienic preparations, according to claim 13.

In a fourth aspect, the invention relates to a use of a homogeneous liquid composition according to the first aspect of the invention as antimicrobial ingredient in waters, perfumes, cosmetics and/or personal care products, according to claim 14.

In a fifth aspect, the invention relates to a cosmetic, pharmaceutical, dermatological or hygienic product comprising a homogeneous liquid composition according to the first aspect of the invention.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The recitation of numerical ranges by endpoints includes all numbers and fractions subsumed within that range, as well as the recited endpoints.

The expression "wt.-%", here and throughout the description unless otherwise defined, refers to the relative weight of the respective component based on the overall weight of the formulation.

The above-mentioned technical problem was solved by mixing 1,2-octanediol with water and at least one additional C3-C4 alkanediol and/or C3-C4 alkanetriol. These mixtures were surprisingly found to stay liquid within a wide temperature range and not to separate after repeated freezing and thawing.

The phenomenon of freezing-point depression is well-known. It occurs essentially because the foreign molecules do not fit well into the crystal structure of the main component. In a simplified approximation, the freezing-point depression depends mainly on the number of dissolved particles and not on their structure. The freezing-point depression is therefore called a 'colligative property'.

The following equation, also known as Blagden's law, can be used to estimate the freezing-point depression of a liquid which occurs when other compounds are dissolved inside:

$$\Delta T_{FP} = -k_f \cdot b$$

$\Delta T_{FP}$ is the change in the freezing point when other ingredients, which can also be called foreign molecules or additives, are dissolved in or added to a major component.

$k_f$ is the molal freezing point depression constant for the major component. A negative sign is used in this equation to indicate that the freezing point decreases when another ingredient is added.

b is the molality of all dissolved foreign molecules. It is typically expressed in mol/kg.

As can be seen from the above equation, the depression of the freezing point of a liquid is directly proportional to the number of foreign molecules per mass of the major component. However, the chemical structure of the additives can be disregarded only for diluted solutions. At higher concentrations the freezing point depression also depends on the structural properties and interactions of the different components.

Based on this common knowledge, additives consisting of small molecules or ions would have the biggest decreasing impact on the freezing point of a high-melting liquid. In view of applications in personal care products, water as well as short chain alkanediols or alkanetriols would be attractive candidates as additives for the purpose of freezing point depression. All these substances have a low molecular weight, are of low toxicity and of low odor, and they have a comparatively neutral behavior on skin and in formulations.

The partition coefficient between n-octanol and water, also called 'log $P_{OW}$' and performed according to OECD Test No. 117 at 25° C., of 1,2-octanediol is 2.1. This value indicates that 1,2-octanediol is a relatively lipophilic compound. In contrast to that, the log $P_{OW}$ of short chain alkanediols and triols are negative and hence confirm their hydrophilic character. A specialist trained in the art could therefore expect that a mixture of water, 1,2-octanediol and hydrophilic short chain alkanediols and/or alkanetriols would form a hydrophilic phase containing water, and a separate lipophilic phase containing 1,2-octanediol. However, it was surprisingly found that 1,2-octanediol forms stable, homogeneous and low melting solutions in combination with water and alkanediols and/or alkanetriols.

The solubility of water in 1,2-octanediol exceeds 30% at 40° C. However, mixtures of 1,2-octanediol with water tend to form highly viscous gels at ambient temperature which are hard to handle.

Glycerol, with glycerine and 1,2,3-trihydroxypropane as well-known alternative names, is a C3 alkanetriol. The solubility of glycerol in 1,2-octanediol exceeds 30%. However, mixtures of 1,2-octanediol and glycerol tend to be highly viscous and might separate at low temperatures. Furthermore, the addition of high amounts of glycerol to skin care formulations may cause a sticky skin-feel.

The miscibility of 1,2-octanediol with C3-C4 alkanediols is well-known. However, comparably large amounts of these diols are needed for lowering the melting point of 1,2-octanediol below 15° C. Furthermore, C3-C4 polyols are highly hydrophilic components with a log $P_{OW}$ of ≤0, as detailed in the following table (Table 1).

TABLE 1

C3-C4 alkane polyols with log $P_{OW}$ values measured according to OECD Test No. 117 at 25° C.

| Chemical name | INCI name | log $P_{OW}$ (25° C.) |
|---|---|---|
| 1,2,3-trihydroxypropane (glycerol) | glycerin | −1.75 |
| 1,2-propanediol | propylene glycol | 1.07 |
| 1,3-propanediol | propanediol | 0.71 |
| 2-methyl-1,3-propanediol | methylpropanediol | −0.6 |
| 1,2-butanediol | 1,2-butanediol | −0.59 |
| 1,3-butanediol | butylene glycol | −0.92 |
| 1,4-butanediol | 1,4-butanediol | −0.88 |
| 2,3-butanediol | 2,3-butanediol | −0.92 |

A specialist trained in the art could therefore expect that the addition of water to a mixture of 1,2-octanediol and the above-mentioned short chain alkanediols or alkanetriols would lead to a phase separation. However, it was now surprisingly found that the addition of water to these mixtures increases their physical stability in addition to decreasing their melting points. Comparably lower concentrations of the short-chain polyols are therefore needed in order to obtain low-melting compositions. The concentration of the active component 1,2-octanediol in the resulting mixture can be increased due to the presence of water. The aqueous mixtures are also more cost-effective and provide a higher flexibility during formulation compared to anhydrous mixtures. The lower necessary amounts of C3-C4 alkanediol or alkanetriol solvents additionally result in lower unwanted side-effects in formulations and on skin.

In a first aspect, the invention relates to a homogeneous liquid composition comprising:
    as component (A) from 50 wt.-% to 90 wt.-%, preferably from 60 wt.-% to 80 wt.-%, and more preferably from 70 wt.-% to 80 wt.-% of 1,2-octanediol; and
    as component (B) from 0.1 wt.-% to 30 wt.-%, preferably from 1 wt.-% to 30 wt.-%, and more preferably from 10 wt.-% to 30 wt.-% of at least one C3-C4 alkanediol and/or C3-C4 alkanetriol,
supplemented with water as component (C) up to 100 wt.-%.

In a preferred embodiment, the invention relates to a homogenous liquid composition consisting of:
    as component (A) from 50 wt.-% to 90 wt.-%, preferably from 60 wt.-% to 80 wt.-%, and more preferably from 70 wt.-% to 80 wt.-% of 1,2-octanediol; and
    as component (B) from 0.1 wt.-% to 30 wt.-%, preferably from 1 wt.-% to 30 wt.-%, and more preferably from 10 wt.-% to 30 wt.-% of at least one C3-C4 alkanediol and/or C3-C4 alkanetriol,
supplemented with water as component (C) up to 100 wt.-%.

The term "homogenous" or "homogeneous" as used herein has the meaning of a single and clear liquid phase. That is to say the ratio of solute to solvent remains the same throughout the composition and any existing particles a second separate liquid phase are not visible with the naked eye.

All wt.-% are expressed with regard to the total weight of the homogeneous liquid composition according to the first aspect of the invention.

In a preferred embodiment, the invention provides a homogeneous liquid composition according to the first aspect of the invention, wherein the composition comprises from 0.1 wt.-% to 30 wt.-%, more preferably from 1 wt.-% to 25 wt.-%, and even more preferably from 5 wt.-% to 25 wt.-% of water.

In a preferred embodiment, the invention provides a homogeneous liquid composition according to the first aspect of the invention, wherein the component (B) is at least one C3-C4 alkanediol and/or C3-C4 alkanetriol with a log $P_{OW}$ from −2.0 to −0.5, which is measured according to OECD Test No. 117 at 25° C.

In a preferred embodiment, the invention provides a homogeneous liquid composition according to the first aspect of the invention, wherein the component (B) is selected from the group consisting of glycerol, 1,2-propanediol, 1,3-propanediol, 2-methyl-1,3-propanediol, 1,2-butanediol, 1,3-butanediol, 1,4-butanediol and 2,3-butanediol.

In a preferred embodiment, the invention provides a homogeneous liquid composition according to the first aspect of the invention, wherein the component (B) is selected from the group consisting of glycerol, 1,2-propanediol and 1,3-propanediol.

In a preferred embodiment, the invention provides a homogeneous liquid consisting of:
    as component (A) from 50 wt.-% to 90 wt.-% of 1,2-octanediol; and
    as component (B) from 0.1 wt.-% to 30 wt.-% of glycerol, 1,2-propanediol and 1,3-propanediol, more preferably 1.0 wt.-% to 30 wt.-% of glycerol,
supplemented with water as component (C) up to 100 wt.-%.

The use of two components (B) and (C), preferably glycerol (B) and water (C) is necessary in order to obtain a stable liquid composition together with 1,2-octanediol in the high amounts. In the case where either only glycerol or only water is combined with 1,2-octanediol, the corresponding binary mixtures will not be stable liquids. This decisive fact is not explicitly taught by the prior art. Glycerol and water are particularly advantageous due to their low toxicity and high availability. Glycerol and water are both "hydrophilic", while 1,2-octanediol is a "hydrophobic" waxy solid. Obtaining a homogeneous, stable liquid composition from the mixture thereof is surprising.

The homogeneous liquid composition according to the first aspect of the invention is stable also after repeated freeze-thaw cycles, hence avoiding the necessity for homogenization prior to use. One such cycle comprises cooling of the composition below its melting point and subsequent warming above its melting point.

The homogeneous liquid composition according to the first aspect of the invention is a stable homogeneous liquid at low temperature. In a preferred embodiment, the invention provides a homogeneous liquid composition according to the first aspect of the invention, wherein the composition has a melting point of at most 30° C., more preferably at most 25° C., more preferably of at most 20° C., and even more preferably of at most 15° C. The melting point is defined as the lowest temperature where the composition is a clear liquid. It is therefore possible to use the compositions without the necessity of heating by using special equipment. Simple storage at common ambient temperature, for example of between 15° C. and 25° C., is sufficient to obtain a uniform liquid.

In a preferred embodiment, the invention provides a homogeneous liquid composition according to the first aspect of the invention, wherein the composition has a low dynamic viscosity at 20° C., preferably of at most 100 mPa·s, and more preferably of at most 80 mPa·s, as measured with a rotary viscometer at 20° C. The homogeneous aqueous compositions according to the first aspect of the invention typically have a lower viscosity than comparable anhydrous mixtures. The composition comprising water is therefore easier to handle than water-free compositions, thereby improving productivity.

The origin of the components (A) and (B) can vary. The components can be produced starting from various feedstock by means of various technologies such as, but not limited to, organic chemistry, extraction, fermentation or combinations thereof, resulting in a petrochemical and/or vegetal and/or biotechnological origin.

The preparation of a homogeneous liquid composition according to the first aspect of the invention is preferably carried out at a temperature where all its components are liquids. However, it is also possible to dissolve solid components in liquid components. Any heating of the components can either take place directly in a mixing equipment or separately outside. The temperature during mixing should be selected in a way that the mixture stays above its freezing point, in order to ensure the uniformity of the mixture. The order of addition of the separate components can be selected according to practicality and availability of production equipment.

In a further embodiment of the invention, the homogeneous liquid composition is added to an aqueous mixture. A temperature of addition can be chosen according to the process. The preferred temperature of addition is between 0° C. and 100° C. The most preferred procedures include an addition of said composition to an aqueous mixture without any additional heating.

In a second aspect, the invention relates to a use of a homogeneous liquid composition according to the first aspect of the invention by dosing said composition as a liquid in batch and/or continuous processes where said composition is not heated above 30° C. Preferably, said dosing is performed continuously.

In a third aspect, the invention relates to a use of a homogeneous liquid composition according to the first aspect of the invention in cosmetic, pharmaceutical, dermatological or hygienic preparations.

The homogeneous liquid composition according to the first aspect of the invention can be used as ingredient for personal care products, such as, but not limited to:

a. solutions,
b. suspensions,
c. emulsions,
d. gels,
e. ointments,
f. pastes,
g. powders,
h. foams,
i. soaps,
j. capsules,
k. perfumes,
l. hydrosols,
m. shampoos,
n. creams,
o. micellar waters,
p. combinations of a-o.

The composition according to the first aspect of the invention can be added to final formulations of personal care products at any time during the production process. The addition preferably takes place towards the end of the formulation process of the personal care products, in order to ensure a high concentration of 1,2-octanediol in the water phase of the formulation.

In a fourth aspect, the invention relates to a use of a homogeneous liquid composition according to the first aspect of the invention as antimicrobial ingredient in waters, perfumes, cosmetics and/or personal care products.

In a fifth aspect, the invention relates to a cosmetic, pharmaceutical, dermatological or hygienic product comprising a homogeneous liquid composition according to the first aspect of the invention, wherein the product passes a microbial challenge test according to the norm ISO 11930.

The invention is further described by the following non-limiting examples which further illustrate the invention, and are not intended to, nor should they be interpreted to, limit the scope of the invention.

EXAMPLES

Examples 1-25

The melting-point of different compositions comprising 1,2-octanediol was measured. The individual components were thoroughly mixed in a liquid state. The liquid mixtures were cooled to −5° C. and subsequently thawed by warming to 25° C. in steps of 5° C. The melting point was defined as the lowest temperature where all components of the mixture were present as liquids. In the table below (Table 2), relative concentrations of the components are expressed in wt.-%, referring to the relative weights of the respective components based on the overall weight of the composition.

TABLE 2

Melting point ranges of different compositions comprising 1,2-octanediol according to Examples 1-25. Examples 1-14 are embodiments of the first aspect of the invention while Examples 15-25 are comparative Examples. Relative concentrations of the components in wt.-% refer to the relative weights of the respective components based on the overall weight of the composition.

| No* | 1,2-octanediol | water | polyol additive | Melting point range | Appearance at 20° C. |
|---|---|---|---|---|---|
| 1 | 60 wt.-% | 25 wt.-% | 15 wt.-% glycerol | 16-20° C. | Clear liquid |
| 2 | 60 wt.-% | 20 wt.-% | 20 wt.-% glycerol | 6-10° C. | Clear liquid |
| 3 | 60 wt.-% | 15 wt.-% | 25 wt.-% glycerol | 11-15° C. | Clear liquid |
| 4 | 60 wt.-% | 10 wt.-% | 30 wt.-% glycerol | 11-15° C. | Clear liquid |
| 5 | 70 wt.-% | 15 wt.-% | 15 wt.-% glycerol | 11-15° C. | Clear liquid |
| 6 | 75 wt.-% | 15 wt.-% | 10 wt.-% glycerol | 16-20° C. | Clear liquid |
| 7 | 75 wt.-% | 12.5 wt.-% | 12.5 wt.-% glycerol | 11-15° C. | Clear liquid |
| 8 | 75 wt.-% | 10 wt.-% | 15 wt.-% glycerol | 11-15° C. | Clear liquid |
| 9 | 75 wt.-% | 5 wt.-% | 20 wt.-% glycerol | 16-20° C. | Clear liquid |
| 10 | 80 wt.-% | 10 wt.-% | 10 wt.-% glycerol | 16-20° C. | Clear liquid |
| 11 | 70 wt.-% | 10 wt.-% | 20 wt.-% 1,3-propanediol | 11-15° C. | Clear liquid |
| 12 | 70 wt.-% | 20 wt.-% | 10 wt.-% 1,3-propanediol | 6-10° C. | Clear liquid |
| 13 | 70 wt.-% | 10 wt.-% | 20 wt.-% 1,2-propanediol | 6-10° C. | Clear liquid |
| 14 | 70 wt.-% | 20 wt.-% | 10 wt.-% 1,2-propanediol | 6-10° C. | Clear liquid |
| 15** | 60 wt.-% | 0 wt.-% | 40 wt.-% glycerol | 16-20° C. | Clear liquid |
| 16** | 70 wt.-% | 0 wt.-% | 30 wt.-% glycerol | 16-20° C. | Clear liquid |
| 17** | 80 wt.-% | 0 wt.-% | 20 wt.-% glycerol | >25° C. | Turbid viscous gel |
| 18** | 60 wt.-% | 40 wt.-% | / | >25° C. | Turbid viscous gel |
| 19** | 70 wt.-% | 30 wt.-% | / | >25° C. | Turbid viscous gel |
| 20** | 80 wt.-% | 20 wt.-% | / | >25° C. | Turbid viscous gel |
| 21** | 90 wt.-% | 10 wt.-% | / | >25° C. | Turbid viscous gel |
| 22** | 60 wt.-% | 0 wt.-% | 40 wt.-% 1,3-propanediol | 16-20° C. | Clear liquid |
| 23** | 70 wt.-% | 0 wt.-% | 30 wt.-% 1,3-propanediol | 16-20° C. | Clear liquid |
| 24** | 60 wt.-% | 0 wt.-% | 40 wt.-% 1,2-propanediol | 6-10° C. | Clear liquid |
| 25** | 70 wt.-% | 0 wt.-% | 30 wt.-% 1,2-propanediol | 11-15° C. | Clear liquid |

*No = Example number, e.g. No 1 = Example 1;
**comparative examples

The compositions according to embodiments of the invention (Examples 1-14) are all clear liquids with a low-melting point of not more than 20° C. The amounts of polyol additives necessary to achieve a stable mixture are lower in the compositions according to embodiments of the invention (Examples 1-14) than in the comparative compositions (Examples 15-25). The impacts of the additives on formulations comprising 1,2-octanediol are consequently lower for compositions according to embodiments of the invention than for the comparative compositions.

Examples 26-50

The stability of embodiments of the composition of the invention mentioned in Examples 1-14, was evaluated in Examples 26-39 by repeated freezing to −18° C. and thawing to +20° C. Samples of 30 g each were subjected to three consecutive freeze-thaw-cycles. The uniformity of the mixtures was subsequently determined by measuring the refractive indices of the upper and lower layers at +20° C. Comparative Examples 40-50 were evaluated as stated below in Table 3 for comparative purposes.

TABLE 3

Refractive index measurement results of different compositions comprising 1,2-octanediol according to Examples 26-50. Examples 26-39 are embodiments of the first aspect of the invention while Examples 40-50 are comparative Examples. Relative concentrations of the components in wt.-% refer to the relative weights of the respective components based on the overall weight of the composition.

| No* | 1,2-Octanediol | Water | Polyol additive | $n_D^{20}$** lower layer | $n_D^{20}$** upper layer | Aspect at 20° C. |
|---|---|---|---|---|---|---|
| 26 | 60 wt.-% | 25 wt.-% | 15 wt.-% glycerol | 1.425 | 1.425 | Clear liquid |
| 27 | 60 wt.-% | 20 wt.-% | 20 wt.-% glycerol | 1.431 | 1.432 | Clear liquid |
| 28 | 60 wt.-% | 15 wt.-% | 25 wt.-% glycerol | 1.437 | 1.439 | Clear liquid |
| 29 | 60 wt.-% | 10 wt.-% | 30 wt.-% glycerol | 1.444 | 1.445 | Clear liquid |
| 30 | 70 wt.-% | 15 wt.-% | 15 wt.-% glycerol | 1.438 | 1.438 | Clear liquid |

TABLE 3-continued

Refractive index measurement results of different compositions comprising 1,2-octanediol according to Examples 26-50. Examples 26-39 are embodiments of the first aspect of the invention while Examples 40-50 are comparative Examples. Relative concentrations of the components in wt.-% refer to the relative weights of the respective components based on the overall weight of the composition.

| No* | 1,2-Octanediol | Water | Polyol additive | $n_D^{20}$ ** lower layer | $n_D^{20}$ ** upper layer | Aspect at 20° C. |
|---|---|---|---|---|---|---|
| 31 | 75 wt.-% | 15 wt.-% | 10 wt.-% glycerol | 1.435 | 1.436 | Clear liquid |
| 32 | 75 wt.-% | 12.5 wt.-% | 12.5 wt.-% glycerol | 1.438 | 1.439 | Clear liquid |
| 33 | 75 wt.-% | 10 wt.-% | 15 wt.-% glycerol | 1.442 | 1.443 | Clear liquid |
| 34 | 75 wt.-% | 5 wt.-% | 20 wt.-% glycerol | 1.446 | 1.447 | Clear liquid |
| 35 | 80 wt.-% | 10 wt.-% | 10 wt.-% glycerol | 1.440 | 1.441 | Clear liquid |
| 36 | 70 wt.-% | 10 wt.-% | 20 wt.-% 1,3-propanediol | 1.436 | 1.438 | Clear liquid |
| 37 | 70 wt.-% | 20 wt.-% | 10 wt.-% 1,3-propanediol | 1.429 | 1.431 | Clear liquid |
| 38 | 70 wt.-% | 10 wt.-% | 20 wt.-% 1,2-propanediol | 1.435 | 1.436 | Clear liquid |
| 39 | 70 wt.-% | 20 wt.-% | 10 wt.-% 1,2-propanediol | 1.429 | 1.429 | Clear liquid |
| 40*** | 60 wt.-% | 0 wt.-% | 40 wt.-% glycerol | 1.457 | 1.456 | Solid + liquid |
| 41*** | 70 wt.-% | 0 wt.-% | 30 wt.-% glycerol | 1.455 | 1.456 | Turbid gel |
| 42*** | 80 wt.-% | 0 wt.-% | 20 wt.-% glycerol | | | Turbid gel |
| 43*** | 60 wt.-% | 40 wt.-% | / | 1.335 | 1.423 | Turbid gel |
| 44*** | 70 wt.-% | 30 wt.-% | / | 1.426 | 1.430 | Turbid gel |
| 45*** | 80 wt.-% | 20 wt.-% | / | 1.438 | 1.438 | Turbid gel |
| 46*** | 90 wt.-% | 10 wt.-% | / | 1.451 | 1.451 | Turbid gel |
| 47*** | 60 wt.-% | 0 wt.-% | 40 wt.-% 1,3-propanediol | 1.445 | 1.446 | Clear liquid |
| 48*** | 70 wt.-% | 0 wt.-% | 30 wt.-% 1,3-propanediol | 1.446 | 1.446 | Clear liquid |
| 49*** | 60 wt.-% | 0 wt.-% | 40 wt.-% 1,2-propanediol | 1.441 | 1.441 | Clear liquid |
| 50*** | 70 wt.-% | 0 wt.-% | 30 wt.-% 1,2-propanediol | 1.443 | 1.443 | Clear liquid |

*No = Example number, e.g. No 26 = Example 26;

** $n_D^{20}$ = refractive index measured at 589 nm and 20° C.;

***comparative examples

All the compositions according to embodiments of the first aspect of the invention (Examples 26-39) had a uniform composition also after repeated freezing and thawing. The observed physical stability confirms that the stabilizing effect of water and short chain polyol additives persists also after solidification and subsequent melting.

Examples 51-58

Dynamic viscosities of several compositions according to embodiments of the first aspect of the invention were measured at 20° C. by using a rotary viscometer with spindle R1 at rotation speeds of 6-50 rpm, which corresponds to Examples 51, 53, 55 and 57 shown below in Table 4. Comparative Examples 52, 54, 56 and 58 were evaluated as stated below in Table 4 for comparative purposes.

TABLE 4

Dynamic viscosity results of different compositions comprising 1,2-octanediol according to Examples 51-58. Examples 51, 53, 55 and 57 are embodiments of the first aspect of the invention while Examples 52, 54, 56 and 58 are comparative Examples. Dynamic viscosity measurement were performed by using a rotary viscometer with spindle R1 at rotation speeds of 6-50 rpm. Relative concentrations of the components in wt.-% refer to the relative weights of the respective components based on the overall weight of the composition.

| No* | 1,2-octanediol | Water | Additive | Dynamic viscosity (mPa · s) |
|---|---|---|---|---|
| 51 | 60 wt.-% | 20 wt.-% | 20 wt.-% glycerol | 54 |
| 52** | 60 wt.-% | 0 wt.-% | 40 wt.-% glycerol | 492 |
| 53 | 75 wt.-% | 10 wt.-% | 15 wt.-% glycerol | 75 |
| 54** | 75 wt.-% | 0 wt.-% | 25 wt.-% glycerol | 290 |
| 55 | 70 wt.-% | 10 wt.-% | 20 wt.-% 1,3-propanediol | 50 |
| 56** | 70 wt.-% | 0 wt.-% | 30 wt.-% 1,3-propanediol | 98 |
| 57 | 70 wt.-% | 10 wt.-% | 20 wt.-% 1,2-propanediol | 43 |
| 58** | 70 wt.-% | 0 wt.-% | 30 wt.-% 1,2-propanediol | 85 |

*No = Example number, e.g. No 51 = Example 51;
**comparative examples

All the aqueous mixtures shown in the above table have a significantly lower viscosity than the corresponding water-free mixtures. The blends containing water are therefore easier to handle and dose than comparable anhydrous mixtures.

Examples 59-66

A liquid composition according to Example 6 was used to preserve and disinfect natural hydrosols. Hydrosols are commonly also known as hydrolats or floral waters. These are aqueous distillates resulting from a steam distillation of aromatic plants. Several hydrosols were subjected to microbial challenge tests according to ISO 11930, in order to evaluate their level of protection against microbial contamination. Furthermore, the number of colony forming units per gram (cfu/g) inside the hydrosols was determined in accordance with the European Pharmacopoeia, 10th edition, section 2.6.12 (Total Aerobic Microbial Counts, TAMC and Total Yeast and Mould Counts, TYMC). Results are shown in Table 5, in which also comparative Examples are shown which were performed for comparative purposes.

TABLE 5

Microbial test results of different hydrosols comprising a composition according to Example 6, as shown in Examples 59-62, and of different hydrosols not comprising the composition according to Example 6, as shown in Examples 63-66. Relative concentrations of the components in wt.-% refer to the relative weights of the respective components based on the overall weight of the hydrosol. The hydrosols were subjected to microbial challenge tests according to ISO 11930, in order to evaluate their level of protection against microbial contamination. Furthermore, the number of colony forming units per gram (cfu/g) inside the hydrosols was determined in accordance with the European Pharmacopoeia, 10th edition, section 2.6.12 (Total Aerobic Microbial Counts, TAMC and Total Yeast and Mould Counts, TYMC).

| No* | Hydrosol | Composition according to Example 6 | Result of challenge test (ISO 11930) | TAMC, EP 2.6.12 | TYMC, EP 2.6.12 |
|---|---|---|---|---|---|
| 59 | *Rosa damascena*, 99.25 wt.-% | 0.75 wt.-% | Criteria A | <10 cfu/g | <10 cfu/g |
| 60 | *Eucalyptus globulus*, 99.25 wt.-% | 0.75 wt.-% | Criteria A | <10 cfu/g | <10 cfu/g |
| 61 | *Cedrus Atlantica*, 99.25 wt.-% | 0.75 wt.-% | Criteria A | <10 cfu/g | <10 cfu/g |
| 62 | *Citrus Neroli*, 99.25 wt.-% | 0.75 wt.-% | Criteria A | <10 cfu/g | <10 cfu/g |
| Comparative examples: | | | | | |
| 63** | *Rosa damascena*, 100 wt.-% | 0 wt.-% | failed | >1000 cfu/g | >1000 cfu/g |
| 54** | *Eucalyptus globulus*, 100 wt.-% | 0 wt.-% | failed | >1000 cfu/g | >1000 cfu/g |
| 65** | *Cedrus Atlantica*, 100 wt.-% | 0 wt.-% | failed | >1000 cfu/g | >1000 cfu/g |
| 66** | *Citrus Neroli*, 100 wt.-% | 0 wt.-% | criteria B | >1000 cfu/g | >1000 cfu/g |

*No = Example number, e.g. No 59 = Example 59;
**comparative examples

The obtained challenge test results demonstrate that the crude or raw hydrosols are insufficiently protected against microbial contamination. This finding confirms a risk for contamination by microbes during handling and storage. Furthermore, the TAMC and TYMC analyses reveal the potential presence of microbes inside the raw hydrosols. In contrast to that, the hydrosols comprising a composition according to embodiments of the first aspect of the invention are essentially free of microbes and well protected against external microbial infection.

The liquid form of the added composition according to Example 6 allows for the addition of 1,2-octanediol at ambient temperature without any heating during the handling of the hydrosols. The cold process saves time and energy. It also helps to preserve the original composition of the hydrosols, which contain volatile natural aroma ingredients. These components could partly evaporate upon heating, resulting in an undesired change of the odor profile.

Example 67

A liquid composition according to Example 8 was added to a cleaning formulation at 20° C., said cleaning formulation corresponds to Example 67 and of which the composition is shown in Table 6 below.

TABLE 6

Composition of a cleaning formulation of Example 67 which comprises a liquid composition according to Example 8. Relative concentrations of the components in wt.-% refer to the relative weights of the respective components based on the overall weight of the cleaning formulation.

| Phase | Ingredient | INCI name | wt.-% |
|---|---|---|---|
| A** | water | aqua | ad* 100 |
| | xanthan gum | xanthan gum | 0.6 |
| | Plantacare ™ 818 UP | coco-glucoside | 15.0 |
| | Plantapon ™ ACG HC | sodium cocoyl glutamate | 5.0 |
| | Tego ™ Betain F 50 | cocamidopropyl betaine | 5.0 |
| B** | 50% citric acid | citric acid (and) aqua | ad* pH 5.5 |
| C** | Composition according to Example 8 | caprylyl glycol (and) glycerin (and) aqua | 1.5 |

*ad = up to; "ad* 100" thus means that the amounts of the other ingredients are supplemented with water to 100 wt.-%; "ad* pH 5.5" thus means that 50% citric acid is added until a pH of the formulation of pH 5.5 is obtained.
**A-C denote sub-steps in the formulation process.

The cleaning formulation according to Example 67 is a shampoo. While the unprotected formulation failed a microbial challenge test according to ISO 11930, the same product containing the composition according to Example 8 reached criteria A according to ISO 11930. The production of a shampoo is typically a cold process. Adding a composition according to this invention instead of pure 1,2-octanediol avoids the necessity for heating of the ingredient 1,2-octanediol (INCI: caprylyl glycol). The cold process is more reproducible and saves times and energy.

Example 68

A liquid composition according to Example 14 was added to a shampoo, which shampoo corresponds to Example 68 and of which the composition is shown in Table 7 below.

TABLE 7

Composition of a shampoo of Example 68 which comprises a liquid composition according to Example 14. Relative concentrations of the components in wt.-% refer to the relative weights of the respective components based on the overall weight of the shampoo.

| Phase | Ingredient | INCI name | wt.-% |
|---|---|---|---|
| A** | water | Aqua | ad* 100 |
| | TEGO ™ Beta in F 50 | cocamidopropyl betaine | 4.5 |
| | Texapon ™ NSO UP | sodium laureth sulfate | 35.0 |
| | Plantacare ™ 1200 UP | lauryl glucoside | 3.0 |
| B** | Glucamate VLT thickener | PEG-120 methyl glucose trioleate (and) propanediol | 0.7 |
| C** | Composition according to Example 14 | caprylyl glycol (and) propylene glycol (and) aqua | 0.5 |
| D** | sodium chloride | sodium chloride | 2.0 |
| E** | citric acid | aqua (and) citric acid | ad* pH 5.5 |

*ad = up to; "ad* 100" thus means that the amounts of the other ingredients are supplemented with water to 100 wt.-%; "ad* pH 5.5" thus means that citric acid is added until a pH of the formulation of pH 5.5 is obtained.
**A-E denote sub-steps in the formulation process.

The resulting shampoo, which is also a hydrogel, reached criteria A in a challenge test according to ISO 11930. No heating was required for the addition of phase C. This production process could be therefore also carried out in continuous production equipment.

Example 69

A liquid composition according to Example 12 was added to water, resulting in a mist formulation corresponding to Example 69 and of which the composition is shown in Table 8 below.

TABLE 8

Composition of a mist formulation of Example 69 which comprises a liquid composition according to Example 12. Relative concentrations of the components in wt.-% refer to the relative weights of the respective components based on the overall weight of the cleaning formulation.

| Phase | Ingredient | INCI name | wt.-% |
|---|---|---|---|
| A** | water | aqua | ad* 100 |
| B** | Composition according to Example 12 | caprylyl glycol (and) propanediol (and) aqua | 0.8 |
| C** | citric acid | citric acid | ad* pH 5.5 |

*ad = up to; "ad* 100" thus means that the amounts of the other ingredients are supplemented with water to 100 wt.-%; "ad* pH 5.5" thus means that citric acid is added until a pH of the formulation of pH 5.5 is obtained.
**A-C denote sub-steps in the formulation process.

A clear solution was obtained upon stirring at ambient temperature. No heating was needed for the introduction of 1,2-octanediol into water.

Example 70

A liquid composition according to Example 6 was added to an O/W emulsion, resulting in a cream corresponding to Example 70 and of which the composition is shown in Table 9 below.

TABLE 9

Composition of a cream of Example 70 which comprises a liquid composition according to Example 6. Relative concentrations of the components in wt.-% refer to the relative weights of the respective components based on the overall weight of the cleaning formulation.

| Phase | Ingredient | INCI name | wt.-% |
|---|---|---|---|
| A** | water | aqua | ad* 100 |
| | xanthan gum | xanthan gum | 0.5 |
| B** | Emulgade™ PL 68/50 | cetearyl glucoside (and) cetearyl alcohol | 5.0 |
| | Sheabutter, refined | *Butyrospermum Parkii* (Shea) butter | 3.0 |
| | Jojoba oil | *Simmondsia Chinensis* (Jojoba) oil | 3.0 |
| | hazelnut oil, Bio | *Corylus Avellana* (Hazel) seed oil | 3.0 |
| C** | tocopherol | tocopherol | 0.1 |
| D** | 50% citric acid | citric acid (and) aqua | ad* pH 5.5 |
| E** | Composition according to example 1, entry 7 | caprylyl glycol (and) glycerin (and) aqua | 0.5 |

*ad = up to; "ad* 100 thus" means that the amounts of the other ingredients are supplemented with water to 100 wt.-%; "ad* pH 5.5" thus means that 50% citric acid is added until a pH of the formulation of pH 5.5 is obtained.
**A-E denote sub-steps in the formulation process.

The obtained cream reached criteria A in a microbial challenge test according to ISO 11930. No heating was required for the addition of phase E, which allowed for the introduction of 1,2-octanediol at the end of the process. This procedure increases the concentration of 1,2-octanediol in the water phase and maximizes its antimicrobial effect. Lower concentrations of 1,2-octanediol can therefore be used, resulting in lower costs and a product that is milder to the skin.

The invention claimed is:

1. A homogeneous liquid composition, wherein the composition is a homogeneous liquid at 30° C., consisting of:
    as component (A) from 50 wt.-% to 90 wt.-% of 1,2-octanediol; and
    as component (B) from 0.1 wt.-% to 30 wt.-% of at least one C3-C4 alkanediol and/or C3-C4 alkanetriol,
    supplemented with water as component (C) up to 100 wt.-%.

2. The homogeneous liquid composition according to claim 1, wherein the component (A) ranges from 60 wt.-% to 80 wt.-% of 1,2-octanediol.

3. The homogeneous liquid composition according to claim 1, wherein the component (C) ranges from 0.1 wt.-% to 30 wt.-% of water.

4. The homogeneous liquid composition according to claim 3, wherein the component (C) ranges from 1 wt.-% to 25 wt.-% of water.

5. The homogeneous liquid composition according to claim 1, wherein the component (B) is selected from the group consisting of glycerol, 1,2-propanediol, 1,3-propanediol, 2-methyl-1,3-propanediol, 1,2-butanediol, 1,3-butanediol, 1,4 butanediol and 2,3-butanediol.

6. The homogeneous liquid composition according to claim 5, wherein the component (B) is selected from the group consisting of glycerol, 1,2-propanediol and 1,3-propanediol.

7. The homogeneous liquid composition according to claim 1, wherein the component (B) ranges from 0.1 wt.-% to 30 wt.-% of glycerol, 1,2-propanediol and 1,3-propanediol.

8. The homogeneous liquid composition according to claim 1, wherein the composition has a melting point of at most 25° C.

9. The homogeneous liquid composition according to claim 1, wherein the composition has a dynamic viscosity of at most 80 mPa·s at 20° C. as measured with a rotary viscometer at 20° C.

10. A method comprising:
    dosing the composition of claim 1 as a liquid in batch and/or continuous processes, wherein the composition is not heated above 30° C.

11. The method of claim 10, wherein the dosing is performed continuously.

12. The method of claim 10, wherein the composition is dosed in a cosmetic, pharmaceutical, dermatological, or hygienic preparation.

13. A method comprising:
    dosing the composition of claim 1 as an antimicrobial composition or agent.

14. The homogeneous liquid composition according to claim 1, wherein the composition is a cosmetic, pharmaceutical, dermatological, or hygienic product that passes a microbial challenge test according to norm ISO 11930.

* * * * *